United States Patent [19]
Bolsworth et al.

[11] Patent Number: 5,803,549
[45] Date of Patent: Sep. 8, 1998

[54] SELF-LOCKING FORKBOLT

[75] Inventors: James Bolsworth, Sterling Heights; Julie Beth Williquette, Warren, both of Mich.

[73] Assignee: General Motors Corporation, Detroit, Mich.

[21] Appl. No.: 870,644

[22] Filed: Jun. 6, 1997

[51] Int. Cl.⁶ ..................................... B60N 2/44
[52] U.S. Cl. ................... 297/463.1; 248/503.1; 296/65.03
[58] Field of Search ..................... 297/331, 335, 297/336, 463.1; 248/503.1; 296/65.1

[56] References Cited

U.S. PATENT DOCUMENTS

| 3,594,852 | 7/1971 | Krawagna | 16/150 |
|---|---|---|---|
| 3,661,172 | 5/1972 | Miller | 137/434 |
| 4,865,377 | 9/1989 | Musser et al. | 248/503.18 |
| 5,482,345 | 1/1996 | Bolsworth et al. | 276/65.1 |
| 5,685,612 | 11/1997 | MacDonald et al. | 248/503.18 |

FOREIGN PATENT DOCUMENTS

| 359034939 | 2/1984 | Japan | 297/463.1 |
|---|---|---|---|
| 405294176 | 11/1993 | Japan | 248/503.1 |

*Primary Examiner*—Peter R. Brown
*Attorney, Agent, or Firm*—Patrick M. Griffin

[57] ABSTRACT

A self-locking forkbolt uses an absolute minimum of components, comprising only a latch pivoted near a pin receiving slot in the flat surface of a structural member, with no need for a separate biasing spring to hold the latch closed across the slot and trap the pin. Instead of a separate spring, the latch is formed of an inherently resilient material that is pushed slightly away from the flat surface to which it is pivoted, in all positions but the fully closed position of the latch, by an integral tab. At the fully closed position of the latch, the tab snaps into a retention hole, to firmly lock the latch in its closed position to trap the pin in the slot.

3 Claims, 3 Drawing Sheets

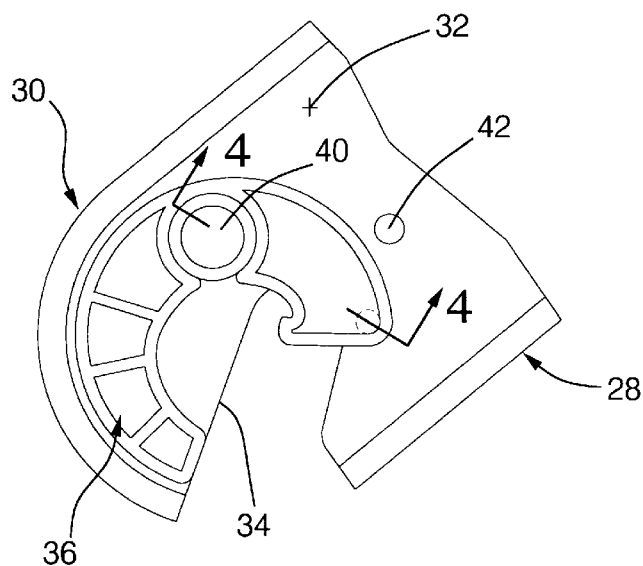
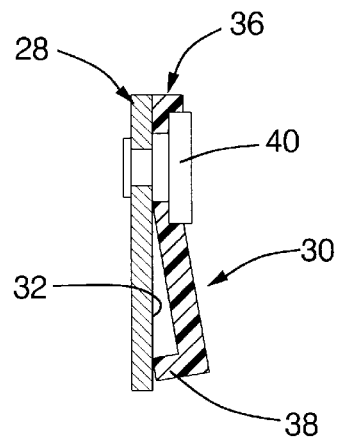
FIG. 3
FIG. 4
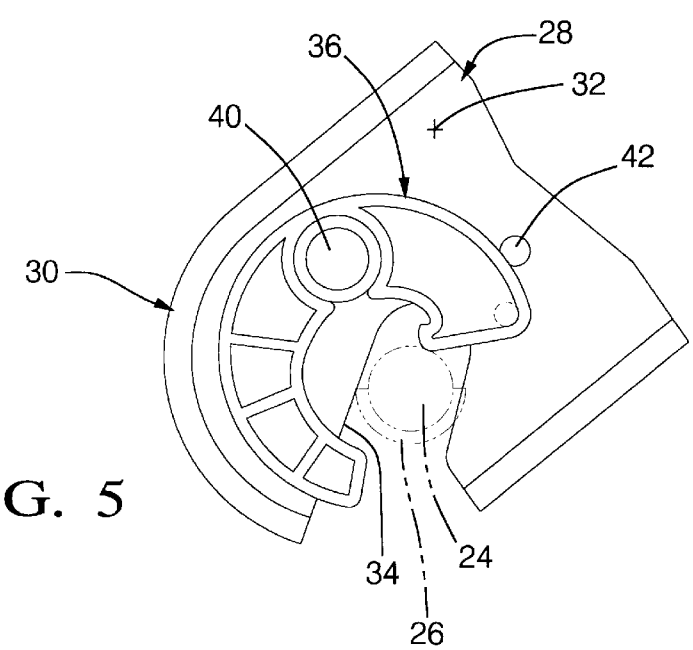
FIG. 5
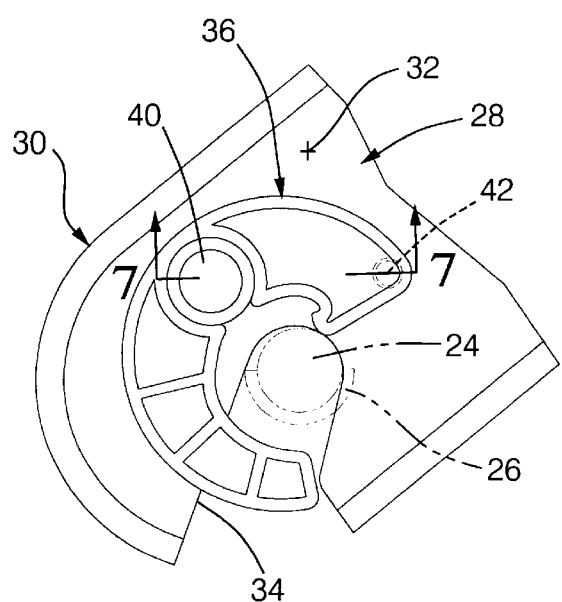
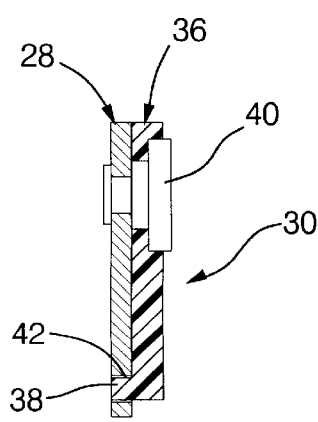
FIG. 6
FIG. 7

SELF-LOCKING FORKBOLT

TECHNICAL FIELD

This invention relates to forkbolts of the type used to pivotally attach one structural member to another, and specifically to such a forkbolt that passively locks to a pin with a minimum of components.

BACKGROUND OF THE INVENTION

So called forkbolts are a common means for attaching one structural member, usually a movable member, to a fixed pin of another member. Examples common in the auto industry are hood latches and removable seats. In a standard forkbolt, a generally C shaped, rigid latch pivoted next to an open ended pin slot rotates across the slot after the pin has been received in the slot to trap the pin in place. Typically, a torsion spring hooked around the pivot of the latch biases it toward the closed or locked position. The forkbolt may be used as part of a releasable latch, in which case a cable movable detent lever is provided to releasably lock the forkbolt closed. The forkbolt may also be used as a semi-permanent attachment, as for a vehicle rear seat back that pivots down to open up a trunk space, but which would rarely need to be removed once installed. In that case, no remotely activated release is needed or provided. Instead, the latch would be spring biased toward the closed position, across the slot, with a camming surface on the end that allows the pin to push it passively out of the slot as the pin enters the slot. The spring then automatically closes the latch to trap the pin after the pin has entered the slot. The inner surface of the latch is curved so as to hook the pin if the pin should attempt to move out of the slot, so the spring force alone is enough to hold the latch closed and keep the pin trapped in the slot. While a forkbolt of this basic design works well enough, and retains the pin in the slot strongly, a forkbolt that self-locked, that is, which eliminated the separate spring, could present a potential savings. Such a simplified design that maintained or even increased the strength of pin retention would be particularly valuable.

SUMMARY OF THE INVENTION

The invention provides a such a self-locking forkbolt, which pivotally attaches a structural member to a fixed pin with no separate spring to bias the latch closed, but with a retention force that is as strong or stronger as that found in conventional forkbolts.

In the preferred embodiment disclosed, the forkbolt is incorporated in the lower end of a folding automotive rear seat. The flat, lower end of the vertical seat leg has an open ended pin slot, which drops into a horizontal pin fixed to the vehicle floor. A generally C shaped, plastic latch is pivoted by a rivet intermediate its upper and lower ends flat to the flat surface of the leg, near the pin slot. The latch is oriented so as to rotate from an open position, clear of the slot, to a closed position in which the latch lower end crosses and blocks the slot. While the latch is stiff in a plane parallel to the flat surface of the leg, it is inherently flexible, although it is not easily flexed, sideways and out of its flat condition, that is, in a direction perpendicular to the flat surface of the leg. The latch also has an integral tab near its inner end that extends perpendicularly away from its inner surface, and which therefore acts to so flex the latch away from the flat surface of the leg in all positions of the latch, but for its fully closed position. In the fully closed position, the tab pops freely into a hole in the leg, allowing the sideways flexed latch to move to flatten back into an unflexed condition.

In the preferred embodiment disclosed, the upper end of the latch also rests across the slot in its open position, just below the upper end of the slot. The pin thereby contacts the latch when the pin is forced up into the slot, passively rotating the latch from its open to closed position. Thereafter, any force attempting to rotate the latch back to its open position is strongly resisted by virtue of the tab's location in the tab hole. Because the tab is normal to the direction of the potential plane of rotation of the latch, no component of that force acts to pull the tab out of the hole. Only the breaking strength of the tab limits the retention force of latch, which can easily be made to equal and exceed the retention force that would otherwise be provided by the eliminated latch biasing spring.

BRIEF DESCRIPTION OF THE DRAWINGS

These and other features of the invention will appear from the following written description, and from the drawings, in which:

FIG. 3 a plan view of a preferred embodiment of the invention in the open position;

FIG. 4 is a sectional view taken along the line 4—4 of FIG. 5;

FIG. 5 is a view like FIG. 3, but showing the latch partially rotated from open to closed position;

FIG. 6 is a view like FIG. 5, but showing the latch rotated all the way to closed position; and FIG. 7 is a sectional view taken along the line 7—7 of FIG. 6.

DESCRIPTION OF THE PREFERRED EMBODIMENT

Figure 1:
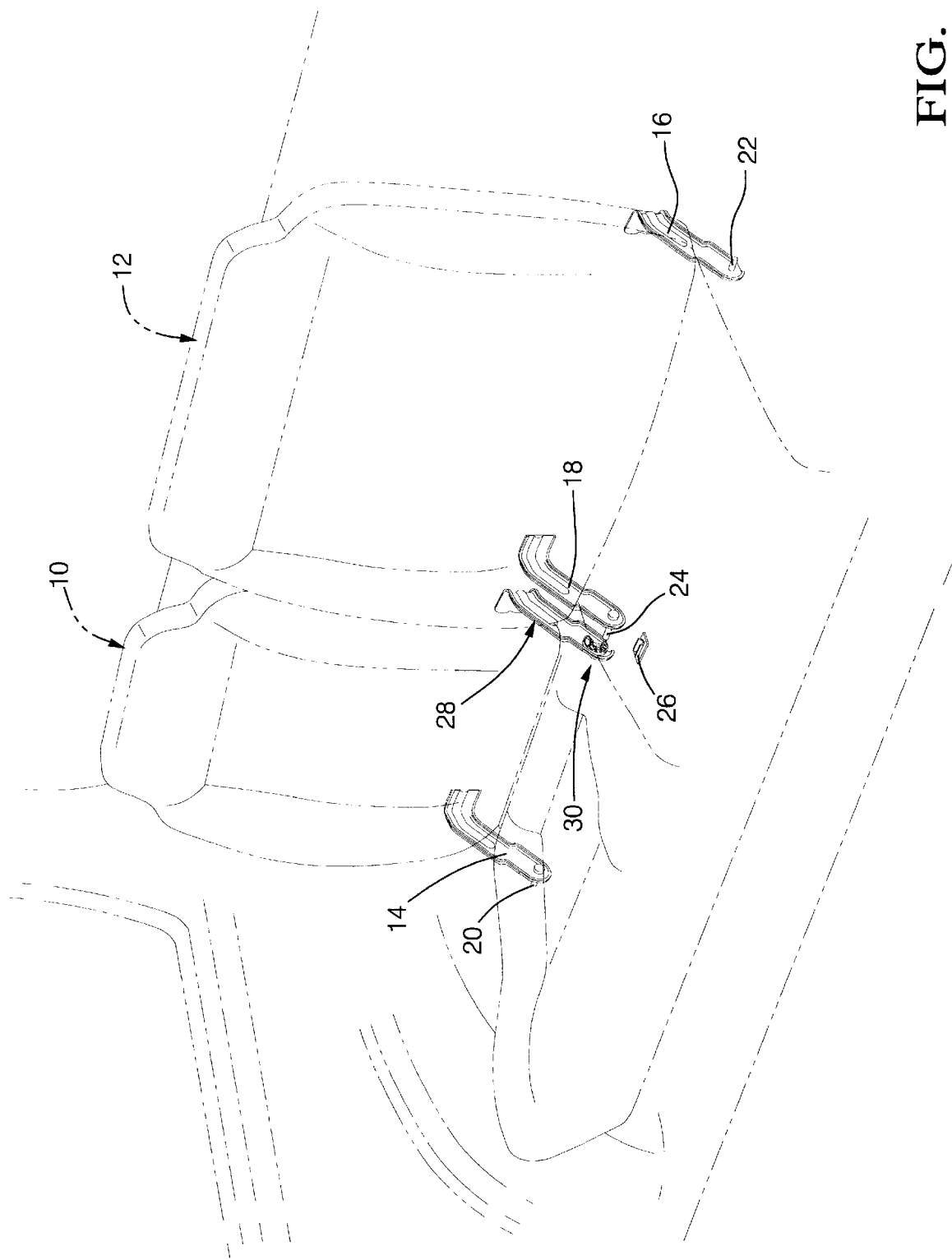
FIG. 1 is a schematic perspective view of a pair of pivoting rear seats incorporating a preferred embodiment of the invention.
Figure 2:
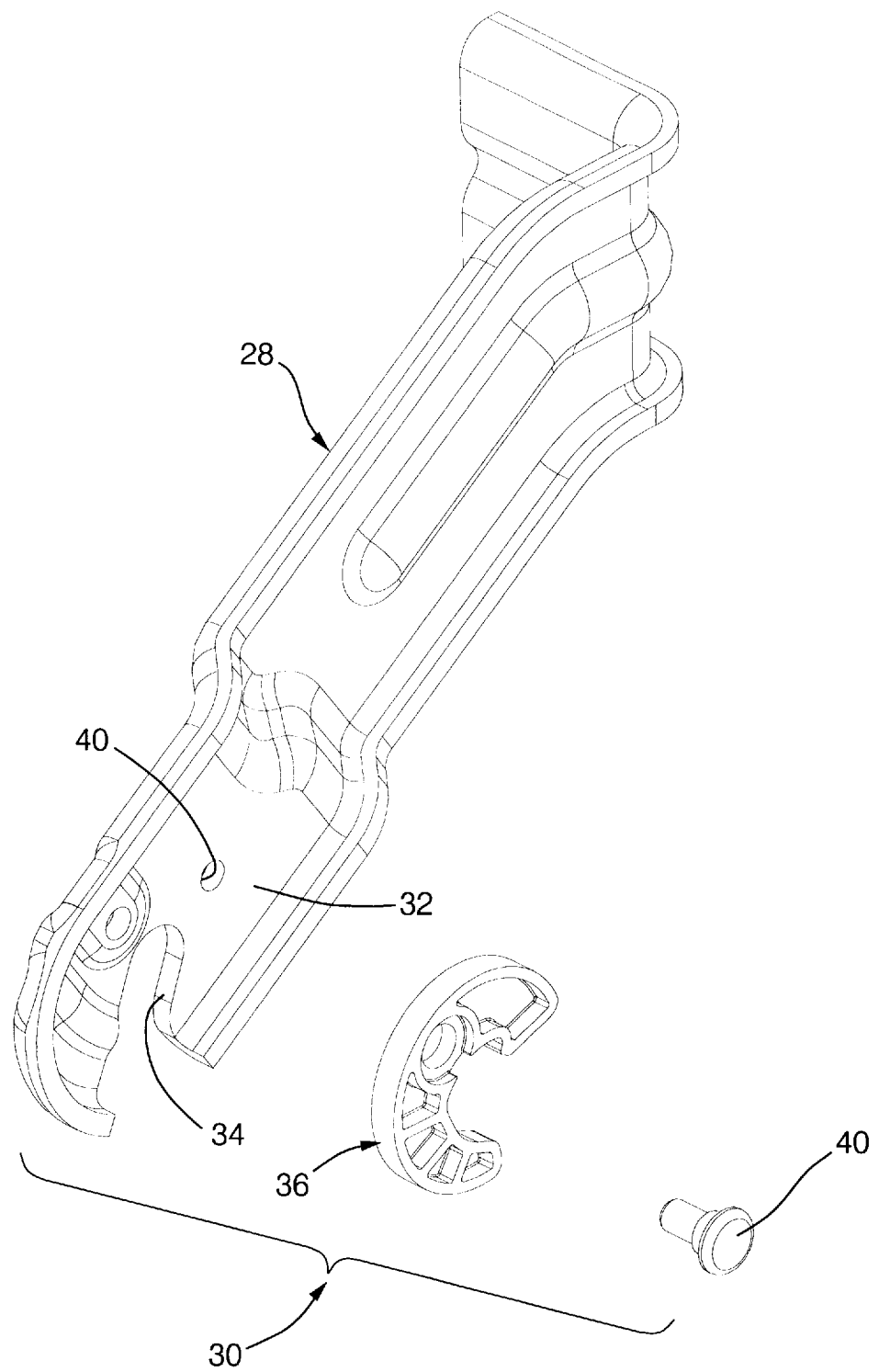
FIG. 2 is a perspective view of just the seat leg, showing the latch and its pivot disassebled from the seat leg.

Referring first to FIGS. 1 and 2, a pair of so called split or folding rear seat backs is indicated at 10 and 12. Seat 10 is narrower, and 12 wider, but each operates in basically the same fashion to fold down, when released, and thereby open up the trunk space to allow the intrusion of larger cargo into the rear passenger space. Support leg members on the seats 10 and 12, including two outboard legs 14 and 16, and the inboard leg member 18 of the wider seat 12, incorporate rigid projecting pins 20, 22, and 24 respectively. The two outboard pins 20 and 22 fit sideways and closely into closed journal bracket slots, not illustrated. The inboard pin 24 rests in a cradle shaped half sleeve 26 that is fixed to the vehicle floor. The inboard leg of the narrower seat 10, indicated generally at 28, incorporates the self-locking forkbolt of the invention, a preferred embodiment of which is indicated generally at 30. To install the seats 10 and 12, the outboard pin 22 of the wider seat 12 is first installed in its bracket slot. The inboard pin 24 is lain across the cradle 26, and it is long enough to project slightly beyond the end of cradle 26. Then, the outboard pin 20 of the narrower seat 10 is installed in its bracket slot, and the inboard leg 28 is pushed down to snap the self-locking forkbolt 30 around both the end of cradle 26 and the projecting end of pin 24, thereby completing the installation. The structural details of forkbolt 30 and its operation which are described next.

Referring next to FIGS. 2, 3 and 4, the inner surface 32 of the wider seat's inboard leg 28 is generally flat and planar and, in the installed position, is oriented substantially perpendicular to the horizontal pin 24, even though the leg 28 itself is not vertical. A closed ended slot 34 cut through the end of leg 28 and through surface 32 is sufficiently wide to freely, but closely, receive the width of pin 24. A molded plastic latch, indicated generally at 36, has a basic C shape, and is generally flat, at least in an unflexed state. It is rigid in its own plane, but is resilient enough to be capable of being flexed sideways or out of its plane. Latch 36 has one feature that departs from its basic flat shape, which is a perpendicular locking tab 38 integrally molded to the inner surface near its upper end, best seen in FIG. 4. Latch 36 is pivoted by a rivet 40, intermediate its upper and lower ends, to the seat leg inner surface 32, near the slot 34. In an open condition, shown in FIG. 3, the lower end of latch 36 is completely clear of the lower, open end of slot 34, while the latch upper end sits just below the upper, closed end of slot 34. As such, the inner surface of the latch 36 would be held flat against the leg inner surface 32, but for the fact that the locking tab 38 is interposed. The end of the locking tab 38 bears against the surface 32, prying the upper end of latch 36 sideways and away from surface 32 and bending at least that portion of the latch 36 above the rivet 40 resiliently out and away from its unflexed condition, as shown in FIG. 4.

Referring next to FIGS. 5, 6 and 7, the operation of forkbolt 30 is illustrated. As seen in FIG. 5, once the wider seat 12 has been installed, the cradle 26 and the pin 24 extending horizontally beyond it are fixed, at least in the downward and side to side directions. After the outboard pin 20 of the narrower seat 10 has been installed, the inboard leg 28 of narrower seat 10 is pushed down toward the pin 24 and cradle 26, and the end of pin 24 moves into and through the slot 34, as shown in FIG. 5. The top surface of pin 24 hits the upper end of latch 36, and begins to rotate it around counterclockwise. Simultaneously, the end of cradle 26 from which pin 24 extends moves along the surface 32, but it is too wide to move into the slot 34. The latch 36 is large enough to wrap around the lower surface of the cradle 26, however, which it does. Eventually, as seen in FIG. 6, the latch 36 rotates around far enough that its lower end crosses and completely blocks the end of slot 34. At this point, the latch locking tab 38, the end of which has been dragging along the surface 32, aligns with and snaps freely but closely into a reception hole 42. At this point the latch 36 can and does snap back to it's flat condition, as best seen in FIG. 7. Latch 36 is stopped from further rotation at that point, and is rigidly held in what may be termed a closed or locked position, with the end of pin 24 trapped between the cradle 26 and the upper end of slot 34. If a force pushes leg 28 down, the solid upper end of slot 34 hits the upper surface of the projecting end of pin 24 and serves only to push pin 24 down into the solid cradle 26. If a dislodging force pulls leg 28 up, the lower end of latch 36 hits the undersurface of the solid cradle 26 and is stopped. The latch 36 does not rotate to reopen the slot 34 and release the cradle 26, since the locking tab 38 would literally have to be broken off by the edge of hole 42 to allow any such rotation. No upward dislodging force would be expected to be that large. The leg 28 is therefore effectively held in place. Similarly, a downward force on the adjacent leg 18 of wider seat 12 would force pin 24 down into the fixed cradle 26, and an upward force would pull pin 24 into the upper end of slot 34, and thereby pull latch 36 against the undersurface of cradle 26. So, both inboard seat legs 28 and 18 are completely retained, and, as noted above, the two outboard legs 14 and 16 are held in place by the other two pins 20 and 22, which are trapped in closed slots in outboard pivot brackets. So, both seats 10 and 12 are completely pivotally retained to rotate up and down, but cannot be removed.

If it should be desired to remove either seat 10 or 12, a flat bladed tool would be used to pry up the upper end of latch 36 far enough to pull the locking tab 38 out of hole 42 and allow the latch 36 to be rotated back toward the open position. This would not be as easy an operation as simply pulling back a typical, spring loaded latch. However, it is rare that the forkbolt 30 would need to be opened, since there is typically no need to remove the seats 10 and 12 once installed, and the saved expense of completely eliminating the latch biasing spring and its installation is well worth it.

The forkbolt 30 disclosed could be used anywhere a semi permanent pivotal connection was desired between a slotted structural member and a fixed pivot pin. The pivotal connection could be made directly to a pin, rather than indirectly to a pin that lies in a fixed cradle 26, as disclosed. The combination of pin 24 and cradle 26 is merely a convenient way of economically installing two adjacent seats with a single forkbolt 30. However, a fixed center bracket in the same location as cradle 26 could hold a fixed horizontal pin that projected at both ends. A forkbolt like 30 associated with the end of each leg 18 and 28 could then be locked independently to each projecting pin end, with no interposed cradle 26. Of course, a single fold down rear seat could be similarly attached, with one or even two forkbolts. A forkbolt like 30 could also be used in non passively or automatically locking design. That is, in a more accessible location, the latch 36 could be externally rotated to its locked position, once the pin was in the slot, rather than having the insertion force of the pin itself rotate the latch passively. The passive rotation feature is very useful in the seat installation context, however. Other materials could be used for the latch 36, such a spring steel, which would be rigid in its own plane, but still resilient and flexible sideways. The molded plastic latch 36 is low cost and light, however, and more than strong enough for most applications. Therefore, it will be understood that it is not intended to limit the invention to just the embodiment disclosed.

We claim:

1. A self-locking forkbolt which attaches a generally planar portion of a structural member pivotally to a pin that is oriented substantially perpendicularly to said structural member planar portion, comprising:

an open ended slot formed in said structural member planar portion, a generally C shaped combination spring and latch pivoted flat to said structural member planar portion adjacent said open ended slot such that said latch can pivot from an open position clear of said slot to a closed position blocking said slot, said latch being substantially rigid in a plane parallel to said structural member planar portion but resilient in a direction substantially perpendicular thereto, said latch also having a locking tab extending toward said structural member planar portion to flex said latch partially away from planar portion when said latch is in said open position, and, a tab reception hole formed in said structural member planar portion into which said locking tab is freely received when said latch has been rotated to said closed position, whereby said structural member may be pivotally attached to said pin by rotating said latch from the open to closed position, whereupon said tab enters said reception hole and said latch flexes back to its flat position, thereby locking said structural member to said pin.

2. A self-locking forkbolt which attaches a generally planar portion of a structural member pivotally to a fixed pin that is oriented substantially perpendicularly to said structural member planar portion, comprising:

a slot formed in said structural member planar portion having an open and a closed end, a generally C shaped combination spring and latch pivoted intermediate upper and lower ends flat to said structural member planar portion adjacent said open ended slot such that said latch can pivot from an open position in which its lower end is clear of the open end of said slot and its upper end rests just below the closed end of said slot to a closed position where its lower end blocks the open end of said slot, said latch being substantially rigid in a plane parallel to said structural member planar portion but resilient in a direction substantially perpendicular thereto, said latch also having a locking tab extending toward said structural member planar portion to flex said latch partially away from planar portion when said latch is in said open position, and, a tab reception hole formed in said structural member planar portion into which said locking tab is freely received when said latch has been rotated to said closed position, whereby said structural member may be pivotally attached to said pin by pushing said pin into said slot until said pin contacts said latch upper end, thereby rotating said latch from the open to closed position, whereupon said tab enters said reception hole and said latch flexes back to its flat position, thereby locking said structural member to said pin.

3. A self-locking forkbolt according to claim 2, further characterized in that said locking tab is located near said latch upper end.

\* \* \* \* \*